US008782290B2

(12) United States Patent
Kothandapani et al.

(10) Patent No.: US 8,782,290 B2
(45) Date of Patent: Jul. 15, 2014

(54) CONFIGURING A MANAGEMENT MODULE THROUGH A GRAPHICAL USER INTERFACE FOR USE IN A COMPUTER SYSTEM

(75) Inventors: Govind Kothandapani, Snellville, GA (US); Bakka Ravinder Reddy, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 81 days.

(21) Appl. No.: 13/193,424

(22) Filed: Jul. 28, 2011

(65) Prior Publication Data

US 2011/0283214 A1    Nov. 17, 2011

Related U.S. Application Data

(60) Continuation of application No. 12/537,584, filed on Aug. 7, 2009, now Pat. No. 8,001,281, which is a division of application No. 10/723,623, filed on Nov. 26, 2003, now Pat. No. 7,237,086.

(51) Int. Cl.
*G06F 3/00* (2006.01)

(52) U.S. Cl.
USPC .................................................. 710/1; 710/8

(58) Field of Classification Search
USPC ....................................................... 710/1, 8
See application file for complete search history.

(56) References Cited

U.S. PATENT DOCUMENTS

| 6,948,008 | B2 | 9/2005 | Hawkins et al. |
| 7,222,313 | B2 | 5/2007 | Bullis et al. |
| 7,237,086 | B1 | 6/2007 | Kothandapani et al. |
| 2002/0073304 | A1* | 6/2002 | Marsh et al. .................. 713/1 |
| 2003/0046470 | A1 | 3/2003 | Sivertsen |
| 2003/0046471 | A1 | 3/2003 | Sivertsen |
| 2003/0101021 | A1 | 5/2003 | Shah et al. |
| 2003/0110244 | A1 | 6/2003 | Mondal |
| 2003/0184596 | A1* | 10/2003 | Kodosky et al. ............ 345/810 |
| 2004/0098521 | A1* | 5/2004 | Lin .............................. 710/72 |
| 2004/0177143 | A1 | 9/2004 | Maciel et al. |
| 2007/0177143 | A1 | 8/2007 | Chaiken et al. |

OTHER PUBLICATIONS

Press Release: "AMI Introduces an Affordable Solution to the Management Needs of Servers and Server Blades", Mar. 18, 2003.
I2C Bus Solutions, I2C Bus Basics, Philips, Jun. 2002.

(Continued)

*Primary Examiner* — Zachary K Huson
(74) *Attorney, Agent, or Firm* — Morris Manning & Martin, LLP; Tim Tingkang, Esq.

(57) ABSTRACT

A customization program for use in customizing a baseboard management controller used for monitoring operation of various computer system components is disclosed. A user interacts with the customization program to customize the baseboard management controller based on a configuration of components specified for the baseboard of the computer system. The customization program provides a user interface having a repository of icons and a design page. The icons represent various components that may be connected, either directly or indirectly, to the baseboard. The design page is used for constructing a model representing the specified configuration of components. As a user drags icons onto the design page, the model is updated to reflect selection of the components corresponding to these icons. Further, the customization program creates a configuration file that identifies and describes each of the selected components. The configuration file is loaded into the baseboard management controller to effectuate the aforementioned customization.

13 Claims, 9 Drawing Sheets

(56) References Cited

OTHER PUBLICATIONS

"MegaRAC-PM: An Affordable System Management Solution", Mega News, Apr. 2003, vol. 4, Issue 4.
"The I2C Bus Specification", Version 2.1, Jan. 2000.
"IPMI—Intelligent Platform Management INterface Specification v1.5", Dpcument Revision 1.1, Feb. 20, 2002.
Super Micro Computer, Inc., IPMI View User Guide , 2002.
RasiSys, "Platform Management: CP80 Platform Management Overview," Oct. 2000, RadiSys Corporation, pp. i-iv, 1-20.
Intel, "Intel Server System SSH4 Board Set," Oct. 2003, Intel Corporation, Intel Order No. C20142-01, Revision 1.4, pp. 1-180.
RadiSys, "Platform Management-Universal Developer's Guide" Dec. 2000, RadiSs Corporation, pp. 1-v1, 1-32.
Intel, "Intela Server System SSH4 Board Set," Oct. 2003, Intel Corporation, Intel Order No. C20142-01, Revision 1.4, pp. 1-180.

* cited by examiner

CONFIGURING A MANAGEMENT MODULE THROUGH A GRAPHICAL USER INTERFACE FOR USE IN A COMPUTER SYSTEM

CROSS REFERENCE TO RELATED APPLICATIONS

This application is a continuation of, and claims benefit of U.S. patent application Ser. No. 12/537,584, filed Aug. 7, 2009, entitled "Configuring a Management Module Through a Graphical User Interface for Use in a Computer System" by Govind A. Kothandapani and Bakka R. Reddy, which status is allowed, and which itself is a division of U.S. Pat. No. 7,237,086, entitled "Configuring a Management Module Through a Graphical User Interface for Use in a Computer System," filed Nov. 26, 2003, and which claims benefit of the filing date of U.S. Pat. No. 7,237,086 via co-pending U.S. patent application Ser. No. 11/754,446 entitled "Configuring a Management Module Through a Graphical User Interface for Use in a Computer System," filed May 29, 2007, which is a division of U.S. Pat. No. 7,237,086. Further, U.S. Pat. No. 7,237,086 is related to subject matter disclosed in U.S. patent application Ser. No. 10/723,712, entitled "Computer Implemented Configuration of a Management Module," filed Nov. 26, 2003. Each of the above applications and patents is herein incorporated by reference in its entirety.

COMPUTER PROGRAM LISTING APPENDIX

A computer program listing appendix is being filed concurrently herewith in the form of a compact disc. Exemplary code listings, labeled Code Listing 1 and a Code Listing 2, are recorded on this compact disc and incorporated in this application by reference.

TECHNICAL FIELD

This invention generally relates to computer platform management, and more particularly, to configuring a platform management controller for use in a computer application system.

BACKGROUND OF THE INVENTION

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect operating and performance-related parameters associated with a computer system and its constituent components. Referring to the examples provided above, these sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components. One such management module is referred to as a "Baseboard Management Controller" (BMC). The BMC is a microcontroller integrated into the baseboard (also known in the industry as the "motherboard") of a computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

The BMC must have knowledge of the types of sensors and devices connected to the contact pins of the BMC in order to correctly ascertain whether any events are occurring in the computer system. The BMC is typically integrated as a component on the baseboard of a computer system, and therefore, it is generally more efficient for baseboard designers to incorporate this knowledge into the BMC during design and manufacturing processes. Unfortunately, the specific layout, i.e., "configuration," of sensors and devices coupled to the contact pins of a BMC dramatically varies from one implementation to another. This variance is commonly based on the preferences of the customers requesting the design/manufacture of the baseboards. As such, it is virtually impossible for designers (also known in the industry as OEMs) to "standardize" the firmware for the BMCs that they are designing and subsequently manufacturing for their customers. For this reason, the firmware for the BMCs are typically customized for each configuration requested by separate customers.

The current approach to configuring a BMC for use on a particular baseboard configuration is to manually incorporate into the BMC firmware a software routine containing information identifying the sensors and devices that are specified for that baseboard configuration. This approach has several drawbacks. First, this approach is extremely time-consuming and requires a significant amount of expertise in firmware/software programming. As such, this current method is not only costly, but also subject to human error. Second, and for similar reasons, updating the firmware of a BMC is a tedious and complicated manual process if, for any reason during the life of the baseboard, the configuration of the baseboard were to change. Thus, the end user of the computer system will most likely not have the expertise to perform the update; rather, the user would most likely have to defer to the assistance of a third party programmer, who undoubtedly will charge dearly for his or her time.

SUMMARY OF THE INVENTION

In accordance with the present invention, the above and other problems are solved by a computer-implemented method and system for customizing a management module for monitoring and/or controlling operation of components of a computer system based on a specific baseboard configuration specified for the computer system. In an embodiment, the management module is customized by a user interacting with a graphical user interface to select components included on the specified baseboard configuration. In response to the user's selection of these components, the present invention creates a configuration file that specifies identification and description information associated with each of the components selected by the user. The configuration file is loaded into that management module in order to configure the module for monitoring and/or controlling operation of the selected components when implemented on the baseboard for use within the computer system.

In accordance with an embodiment, the configuration file is created from a compilation of description files associated with a set of components that may be incorporated onto the baseboard. As the user selects a component, the description file associated with that component is added to the configuration file such that, after all components have been selected, the configuration file includes a description file for each of the selected components. As such, in one particular embodiment, the completed configuration file includes a description file corresponding to each component on the specific baseboard configuration.

To assist the user in creating the configuration file, the graphical user interface may be divided into at least a first portion and a second portion. In this embodiment, the first portion includes a repository of icons each representing a component for which a description file is associated. The second portion is a design page for constructing a model of the specific baseboard configuration using the icons from the repository. To that end, the user is provided the ability to visualize creation of the configuration file through the model under construction. In one embodiment, the user selects a component by dragging the icon corresponding to the components onto the design page.

Further, the graphical user interface also enables the user to define a pin arrangement for the communication connections between components included in the model being constructed. In this embodiment, the present invention provides a validation mechanism that checks each component-to-component connection to determine whether the connection is valid. As such, a model completed through the graphical user interface is intended to be a valid representation of the specific baseboard configuration which will be monitored and/or controlled by the customized management module.

The invention may be implemented as a computer process, a computing system or as an article of manufacture such as a solid state, non-volatile memory device or a computer program product or computer readable media. The computer program product may be a computer storage media readable by a computer system and encoding a computer program of instructions for executing a computer process. The computer program product may also be a communications medium, such as, a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
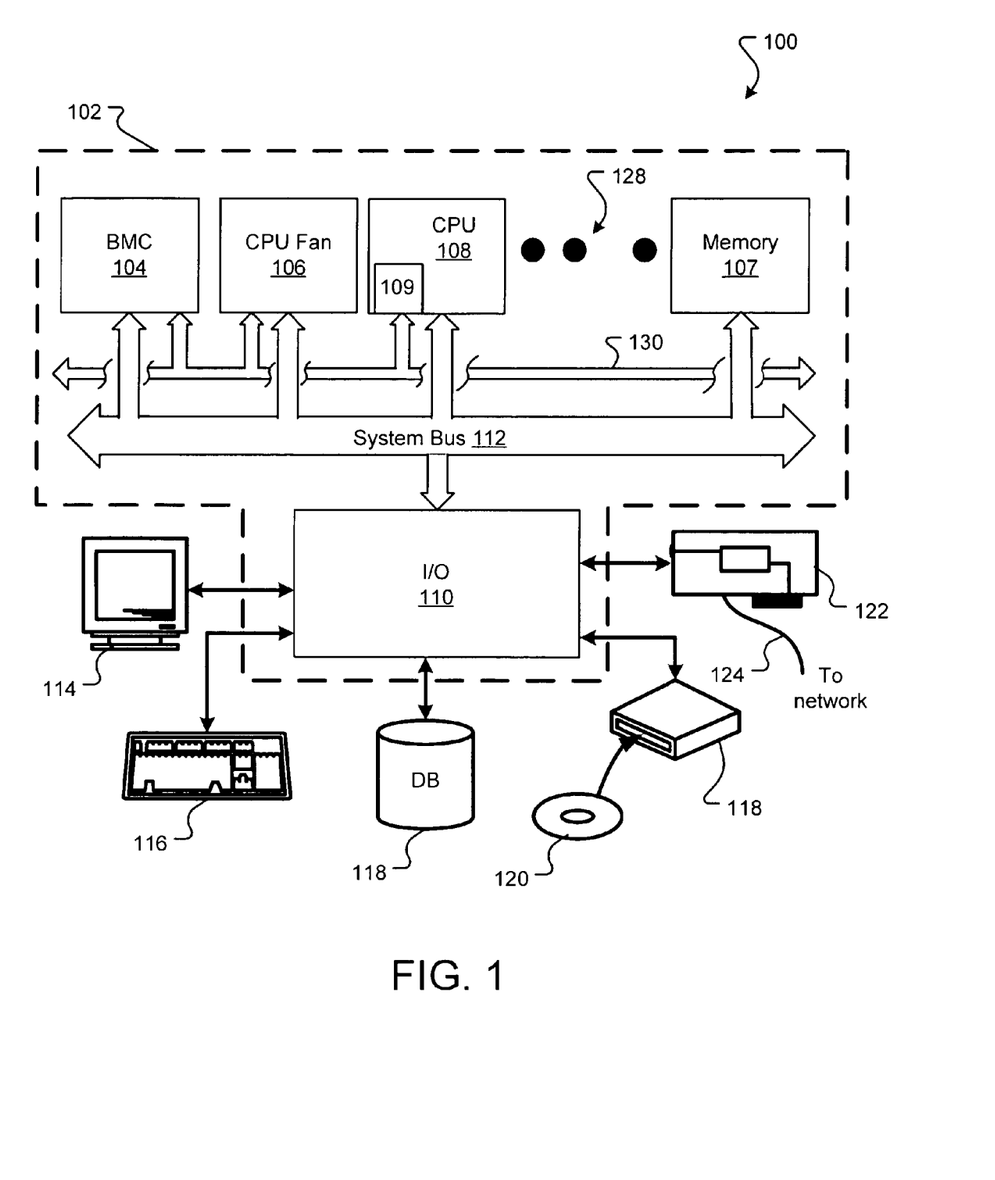
FIG. 1 depicts a computer system in which a management module monitors and controls operation of various components of the computer system in accordance with an embodiment of the present invention.

Referring to FIG. 1, a conceptual illustration of an environment associated with the present invention is shown in accordance with an embodiment of invention. FIG. 1 shows a computer system 100, and more specifically a stand-alone, general purpose computer system. It should be appreciated that the computer system 100 may alternatively be a "special purpose" computer system or a system that incorporates more than one interconnected system, such as a client-server network. Indeed, the computer system 100 of FIG. 1 only represents an exemplary embodiment of the present invention, and therefore, should not be considered to limit the invention in any manner.

The central intelligence of the computer system 100 is a baseboard 102, or "motherboard", which is a printed circuit board to which a multitude of components or devices may be connected by way of a system bus 112 or other electrical communication path (not shown). In an embodiment, these components include, without limitation, a baseboard management controller (hereinafter, "BMC") 104, a central processing unit (hereinafter, "CPU") 108, a CPU fan 106, memory 107 and an Input/Output module 110. It is also contemplated that the system bus 112 may include other components that are not explicitly shown in FIG. 1. As such, repetition dots 128 illustrate the possible connection of these other components to the system bus 112. The layout of components, and the manner in which the components are interconnected, on the baseboard 102 is referred to for the purposes of the present application as the "configuration" of the baseboard 102.

The system bus 112 provides a two-way communication path for all components connected to the system bus 112. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus 112. Buses and the associated functionality of master-slave communications are well-known to those skilled in the art, and therefore not discussed in further detail herein.

The CPU 108 is a standard central processor that performs arithmetic and logical operations necessary for the operation of the computer system 100. CPUs are well-known in the art, and therefore not described in further detail herein. Like many electrical components, the CPU 108 dissipates heat while operating. As such, the CPU fan 106 is used to cool off the CPU 108 once the CPU 108 reaches a prescribed temperature. Such a determination, i.e., whether the CPU 108 exceeds a prescribed temperature, is made by the BMC 104, which is communicatively coupled to a CPU temperature sensor 109 and the CPU fan 106 to provide monitoring functionality over the temperature sensor 109 and control functionality over the CPU fan 106.

In general, the BMC 104 is a microcontroller that monitors operation of the computer system 100. In a more specific embodiment, the BMC 104 monitors health-related aspects associated with the computer system 100, such as, without limitation, temperature of components within the computer system chassis, speed of rotational components (e.g., spindle motor, CPU fan, etc.) within the system, voltage across or being applied to one or more components within the system and available or used capacity of memory devices within the system 100.

To accomplish the above-noted, and other, monitoring functions, the BMC 104 is communicatively connected to one or more components either directly or by way of a management bus 130. In an embodiment, these components include sensor devices for measuring various operating and performance-related parameters within the computer system 100. The sensor devices may be either hardware or software base components configured or programmed to measure or detect one or more of the various operating and performance-related parameters. Like the system bus 112, the component that initiates communication on a bus is referred to a master and the component to which the communication is sent is referred to a slave. As such, the BMC 104 functions as the master on the management bus 130 in most circumstances, but may also function as a slave in other circumstances. Each of the various components communicatively connected to the BMC 104 by way of the management bus is addressed using a slave address.

The management bus 130 is used by the BMC 104 to request and receive various operating and performance related parameters from the one or more components also communicatively connected to the management bus 130. In the embodiment of FIG. 1, the management bus 130 communicatively connects the BMC 104 to the CPU temperature sensor 109 and the CPU fan 106, thereby providing a means for the BMC 104 to monitor and/or control operation of these components. As with the system bus 112, the management bus 130 may include components other than those explicitly shown in FIG. 1. Exemplary components not shown in FIG. 1 may include, without limitation, tachometers, heat sensors, voltage meters, amp meters, and digital and analog sensors. In an embodiment, the management bus 130 is an I$^2$C® bus, which is manufactured by Phillips Semiconductors® and described in detail in the I$^2$C® bus Specification, version 2.1 (January 2000).

The firmware of the BMC 104 adheres to the Intelligent Platform Management Interface (IPMI) industry standard for system monitoring and event recovery. The IPMI standard is well-known to those of ordinary skill in the industry, and therefore not described in detail herein. Rather, revision 1.1 of the IPMI Specification, version 1.5, release date Feb. 20, 2002, is incorporated by reference.

The BMC 104 monitors operating and performance-related parameters received from various components of the computer system 100 in order to determine whether an "event" is occurring within the system 100. For example, with respect to the configuration shown in FIG. 1, the BMC 104 monitors operation of the CPU 108 (by way of the CPU temperature sensor 109) and the CPU fan 106 to determine whether certain operating or performance related parameters exceed or fall below prescribed threshold ranges of operation. An example of such an event may be the temperature reading of heat dissipated by the CPU 108 reaching in excess of 145 degrees Fahrenheit.

In accordance with another embodiment of the invention, the BMC 104 may also control one or more components of the computer system 100 in response to the occurrence of an event. Referring back to the example above, the BMC 104 may initiate the CPU fan 106 upon determining that the temperature dissipated by the CPU 108 has reached 146 degrees Fahrenheit. In addition, it is also contemplated that the BMC 104 may also be connected to and receive sensed information from components connected directly to a contact pin 204 (FIG. 2) of the BMC 104 or indirectly by way of a bus (e.g., system bus 112) other than the management bus 130, as addressed while describing the BMC 104 in greater detail in FIGS. 2-3 in accordance with an embodiment of the invention.

The Input/Output module 110 is used as a communication medium between any number and type of peripheral devices and the system bus 112. Communications destined for the CPU 108, the BMC 104 or any other component coupled to the system bus 112 and issued by a peripheral device must therefore pass through the Input/Output module 110 to the system bus 112 and then to the necessary component. Exemplary peripheral devices are shown in FIG. 1 and described below.

In the embodiment of FIG. 1, the Input/Output module 110 is connected to a user input module 116, e.g., a keyboard, a display unit 114 and one or more program storage devices, such as, without limitation, the disk storage unit 118 and the disk drive unit 119. The user input module 116 is shown as a keyboard, but may also be any other type of apparatus for inputting commands into the CPU 108 or the BMC 104. In accordance with one embodiment, the disk drive unit 119 is a CD-ROM driver unit capable of reading the CD-ROM medium 120, which typically contains programs and data.

In accordance with an alternative embodiment, the disk drive unit 119 may be replaced or supplemented by a floppy drive unit, a tape drive unit, or other storage medium drive unit. A network adapter 122 is capable of connecting the computing system 100 to a network of remote computers via a network link 124. Examples of such systems include SPARC systems offered by Sun Microsystems, Inc., personal computers offered by IBM Corporation and by other manufacturers of IBM-compatible personal computers, and other systems running a UNIX-based or other operating system. A remote computer may be a desktop computer, a server, a router, a network PC (personal computer), a peer device or other common network node, and typically includes many or all of the elements described above relative to the computing system 100. Logical connections may include a local area network (LAN) or a wide area network (WAN). Such networking environments are commonplace in offices, enterprise-wide computer networks, intranets, and the Internet.

In accordance with yet another embodiment, the computing system 100 further comprises an operating system and usually one or more application programs. Such an embodiment is familiar to those of ordinary skill in the art. The operating system comprises a set of programs that control operations of the computing system 100 and allocation of resources. The set of programs, inclusive of certain utility programs, also provide a graphical user interface to the user. An application program is software that runs on top of the operating system software and uses computer resources made available through the operating system to perform application specific tasks desired by the user. In accordance with an embodiment, the operating system employs a graphical user interface 100 wherein the display output of an application program is presented in a rectangular area on the screen of the display device 114. The operating system is operable to multitask, i.e., execute computing tasks in multiple threads, and thus may be any of the following: Microsoft Corporation's "WINDOWS 95," "WINDOWS CE," "WINDOWS 98," "WINDOWS 2000" or "WINDOWS NT" operating systems, IBM's OS/2 WARP, Apple's MACINTOSH OSX operating system, Linux, UNIX, etc.

Figure 2:
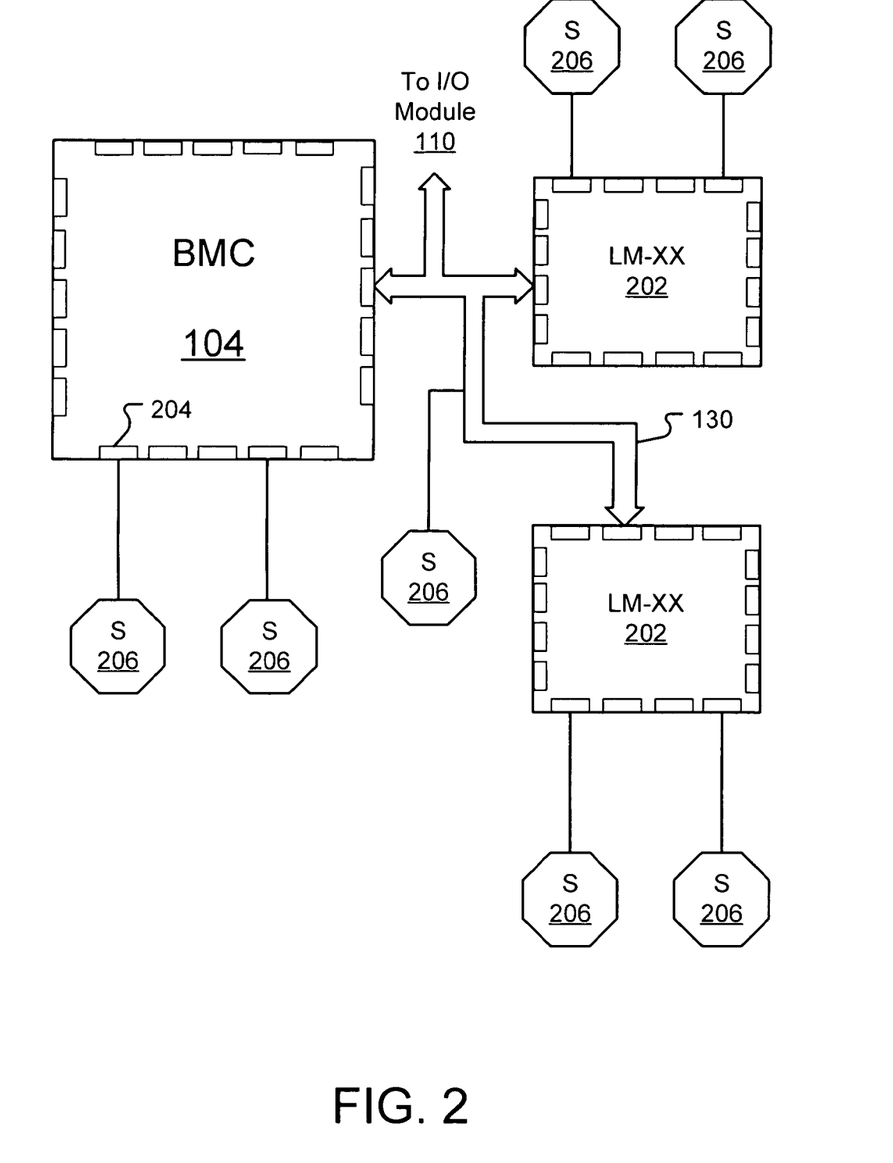
FIG. 2 illustrates a logical configuration of components communicatively connected to the management module of FIG. 1 in accordance with an embodiment of the present invention.

Referring now to FIG. 2, an exemplary configuration of sensor devices (e.g., 202, 206) communicatively connected to the BMC 104 is shown in accordance with an embodiment of the present invention. The sensor devices (e.g., 202, 206) include various types of sensors 206 as well as sensor aggregation components 202. The sensors 206 measure or sense operating and performance-related parameters associated with the computer system 100. The sensor aggregation components 202 receive this information sensed by the sensors 206 and provide this information to the BMC 104 for analysis, and more particularly, for determination on whether an "event" is occurring within the computer system 100.

The sensor aggregation components 202 are shown in FIG. 2 as LM-XX devices (e.g., LM-78 and LM-85 model logic components), but may be any type of hardware and/or software component capable of receiving sensed information and managing the delivery of this information to the BMC 104. Alternatively, the sensor aggregation components 202 may be operable to not only collect and forward sensed information, but also to analyze the sensed information to render advise on the parameters being monitored by the sensors 206. Even further, the sensor aggregation components 202 may be programmed with firmware operable to perform sensing and measuring functions substantially similar to those functions performed by the sensors 206.

As shown in FIG. 2, sensor devices (e.g., 202 and 206) are connected to, and therefore communicate with, the BMC 104 by way of contact pins 204 located on the BMC 104. The sensor devices (e.g., 202, 206) may be connected to the BMC contact pins 204 either directly or by way of the management bus 130. Regardless of the implementation, the functionality of these sensor devices (e.g., 202, 206) is the same: the sensors 206 sense or measure information and subsequently transmit this information to either the BMC 104 or a sensor aggregation component 202; if to the sensor aggregation component 202, then the information is passed by the sensor aggregation component 202 to the BMC 104. The BMC 104 then analyzes the information sensed by these sensor components (e.g., 202, 206) and either 1) issues an alert that an event is occurring; and/or (2) controls operation of one or more components within the computer system based on the determination that an event is taking place.

While the sensors 206 are described in general terms when describing FIG. 2, it should be appreciated that these sensors 206 may be digital or analog sensors that sense any type of information. For example, the sensors 206 may sense, without limitation, temperature of a component (e.g., CPU 108) of the computer system 100, temperature within the chassis of the computer system 100, a voltage and/or current reading associated with a component of the computer system 100, or velocity and/or acceleration of a component (e.g., spindle motor, etc.) of the computer system 100. It is also contemplated that the sensors 206 may implemented as a software/firmware routine that senses information related to events associated with operation of either firmware or software modules implemented on the computer system 100. One such sensor 206 may be a software routine for detecting whether a particular software application program is "locked up," and therefore not operating properly.

Figure 3:
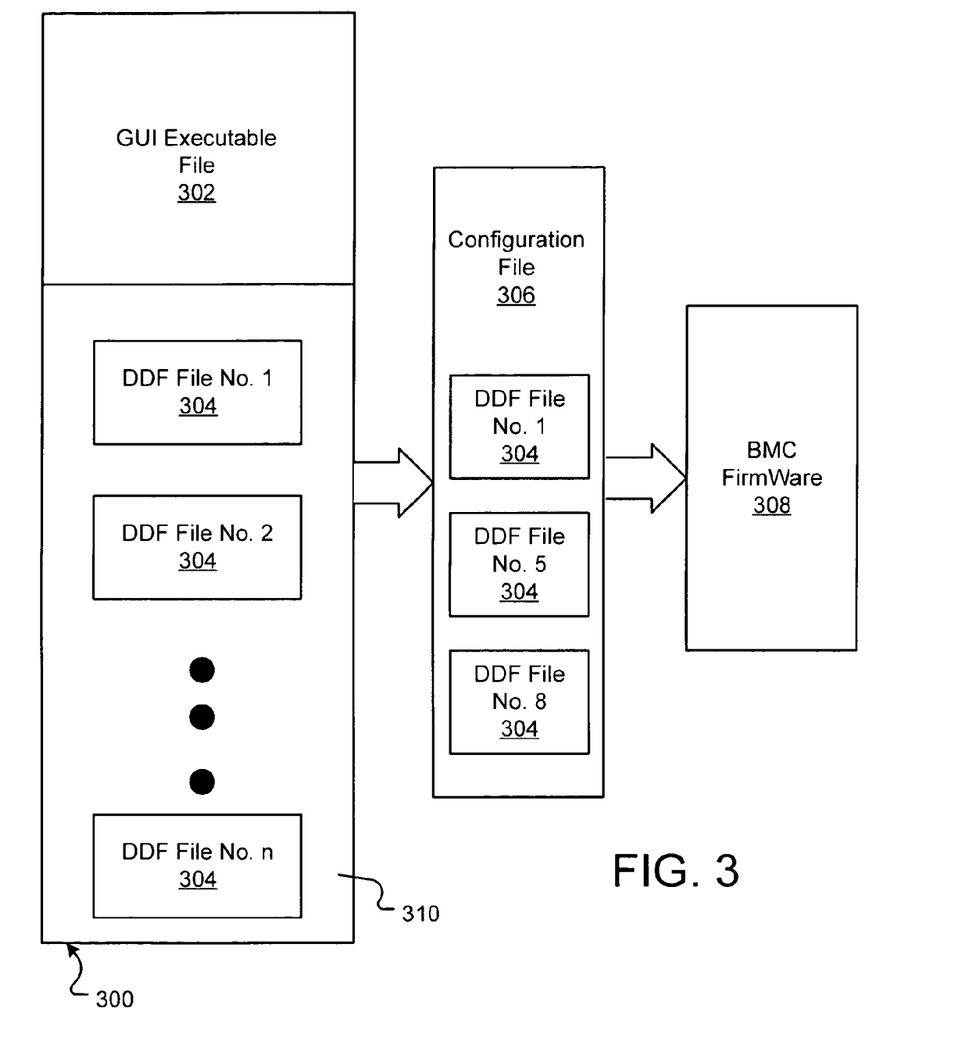
FIG. 3 shows a block diagram illustrating a system for customizing the management module of FIG. 1 for a specific configuration of components specified for a computer system baseboard in accordance with an embodiment of the present invention.

Referring now to FIG. 3, an illustration of firmware/software modules used for customizing BMC firmware 308 for the specific configuration onto which the BMC 104 will be integrated is shown in accordance with an embodiment of the present invention. Once customized, the firmware 308 is loaded into the BMC 104 for use in detecting the occurrence of events in an associated computer system (e.g., 100).

The process by which a user customizes the BMC firmware 308 begins with a customization program 300. The customization program 300 includes a graphical user interface (GUI) executable file 302 and a DDF library 310 storing a plurality of device description files 304 ("DDFs"). In an embodiment, the DDFs 304 are Extensible Markup Language (XML) based software modules that each identify and describe a specific component which may be monitored and/or controlled by the BMC 104. In accordance with another embodiment, the DDF library 310 includes a DDF 304 for any and all components in the industry that may be incorporated onto a baseboard 102. Alternatively, the DDF library 310 may only include a DDF 304 corresponding to only a subset of components known in the industry.

Source code for exemplary DDFs 304 programmed as XMF files are provided in a computer program listing appendix recorded on a compact disc submitted concurrently with this application. These program listings are labeled Code Listing 1 and Code Listing 2, and are incorporated into this application by reference. The XML source code for the DDF 304 labeled Code Listing 1 identifies and describes a temperature sensor that may be used to monitor temperature of various components on a baseboard 102 or within a computer system chassis. The XML source code for the DDF 304 labeled Code Listing 2 identifies and describes a voltage sensor that may be used to monitor a voltage being generated or applied across one or more components on a baseboard 102 or within a computer system chassis.

In an embodiment of the present invention, each DDF 304 in the DDF library 310 includes identification information that defines the classification of the component as well as the type of information that the component associated with that DDF 304 will provide. For example, without limitation, the DDF 304 for a temperature sensor includes a definition (referred to herein as 'type tag") that the component is of the class "sensor" and of the type "temperature." The following excerpt of source code from the DDF 304 labeled Code Listing 1 illustrates an exemplary definition for this identification information:

```
<Class>Sensor</Class>
<Type>Temperature</Type>
```

In accordance with another embodiment, the DDFs 304 include at least one routine executable by the BMC 104 to receive information from or control operation of the component corresponding to the DDF 304. For example, a DDF 304 corresponding to a temperature sensor may include a routine directing the BMC 104 to send a command to the sensor requesting a reading representing the current temperature sensed by the sensor, and upon reception of the reading, to move the reading to a specific register for subsequent analysis. The following excerpt of source code from the DDF 304 labeled Code Listing 1 illustrates an exemplary executable routine for implementation by the BMC 104:

```
<read>
    mov        r1,2
    oemcmd
    orb        r1,$(MONITOR_ON_STANDBY)
    cmpeqb     p2, r1,1
```

The GUI executable file 302 is executed to render and provide to the user a graphical user interface 400 (GUI) for selecting DDFs 304 associated with components included in the configuration specified for the baseboard 102. Reference is made to the configuration being "specified" for the baseboard 102 because it is contemplated that the customization program 300 may be utilized to customize BMC firmware 308 for implementation on both a baseboard 102 under construction and a baseboard 102 that has already been constructed. As the DDFs 304 are selected, the customization program 300 compiles the selected DDFs 304 in a configuration file 306 that will ultimately be loaded into the firmware 308 of the BMC 304. An exemplary representation of a GUI 600 rendered by the GUI executable file 302 is shown in FIGS. 6-9. As such, reference is made to these figures while describing operation of the GUI executable file 302 and the process for customizing the BMC firmware 308.

Figure 6:
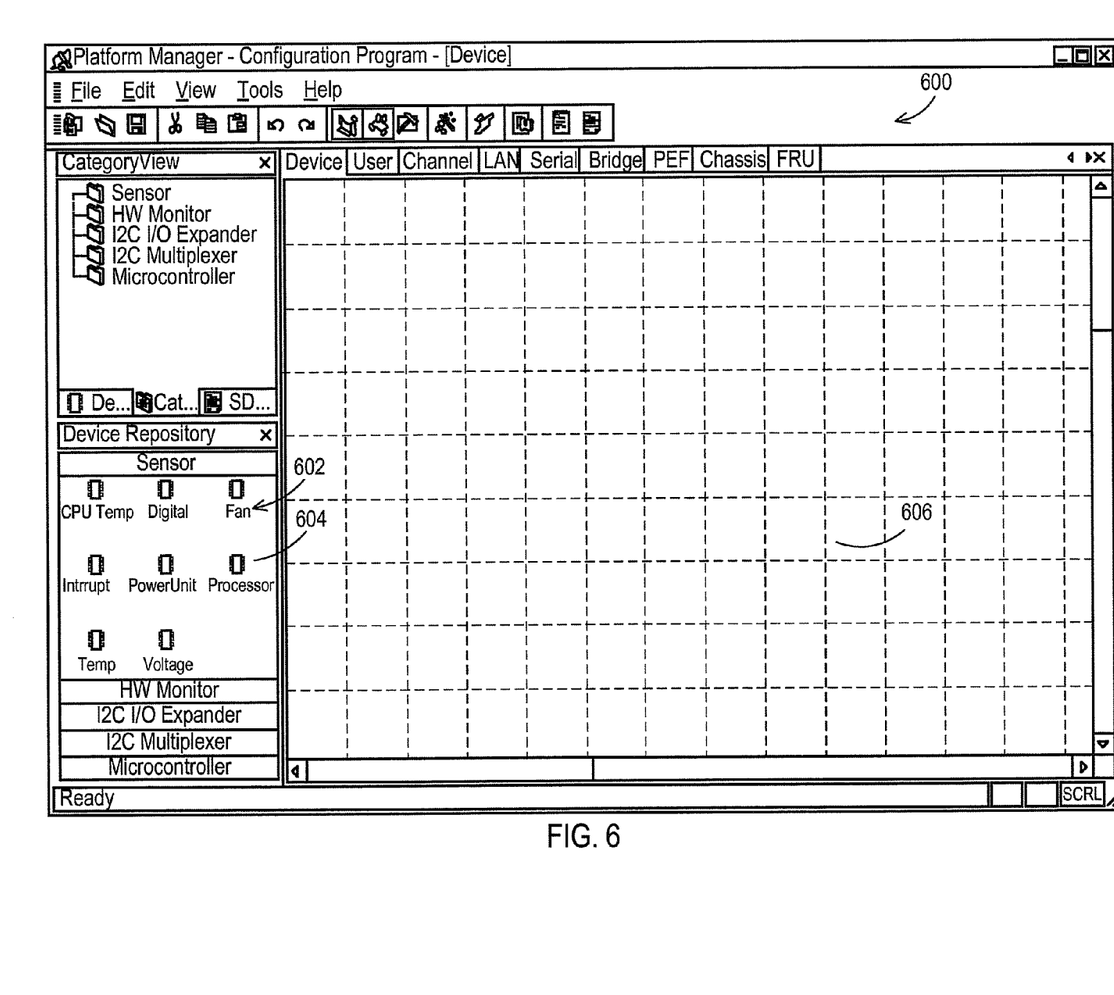
FIGS. 6-9 are screenshots depicting in sequence an embodiment of the invention wherein a graphical user interface is used to customize the management module of FIG. 4 based on the specific configuration of components specified for the computer system baseboard.

The GUI 600 presented to the user includes, among other features, a repository 602 and a design page 606. The design page 606 provides users with a virtual sketchpad for creating a model 608 representing the actual or intended configuration specified for the baseboard 102. The repository 602 includes icon representations 604 of components associated with each DDF 304 included in the DDF library 310.

Figure 7:
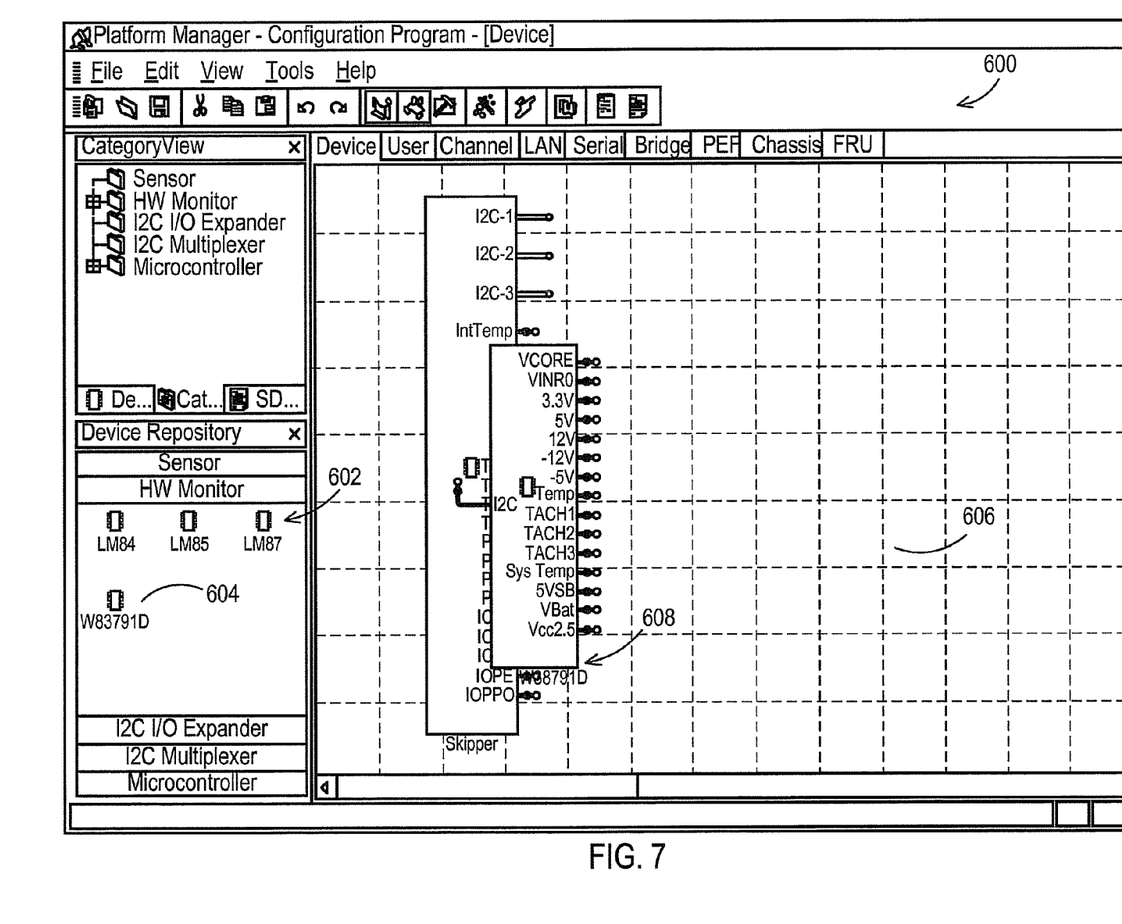

Initially, a user starts the customization program 300 in order to create source code for a configuration file 306 representing the components of an actual or intended baseboard configuration that are to communicatively connect to the BMC 104. As shown in FIG. 6, the initial design page 606 is blank and void of any component icons 604. In order to build the source code for this configuration file 306, the user of the customization program 300 first drags and drops selected icons 604 from the repository 602 onto the design page 606. Each of the icons 604 are selected by the user based on whether or not the configuration specifies that the component associated with the icons 604 are\will be communicatively connected to the BMC 104 for purposes of either monitoring or control, or both. Therefore, the user at least drags and drops an icon for a BMC 104 as well as one or more icons representing sensor devices (e.g., 202, 206) in accordance with embodiments of the present invention. FIG. 7 shows the end-result of dragging two icons onto the design page 606.

As each icon is selected by the user implementing this drag-n-drop process, the DDF 304 associated with the component corresponding to that icon is added to the source code of the configuration file 306 being created. As such, the source code of the configuration file 306 is ultimately created with the DDFs 304 corresponding to those components that are specified as communicatively connected to the BMC 104 by the configuration.

Figure 8:
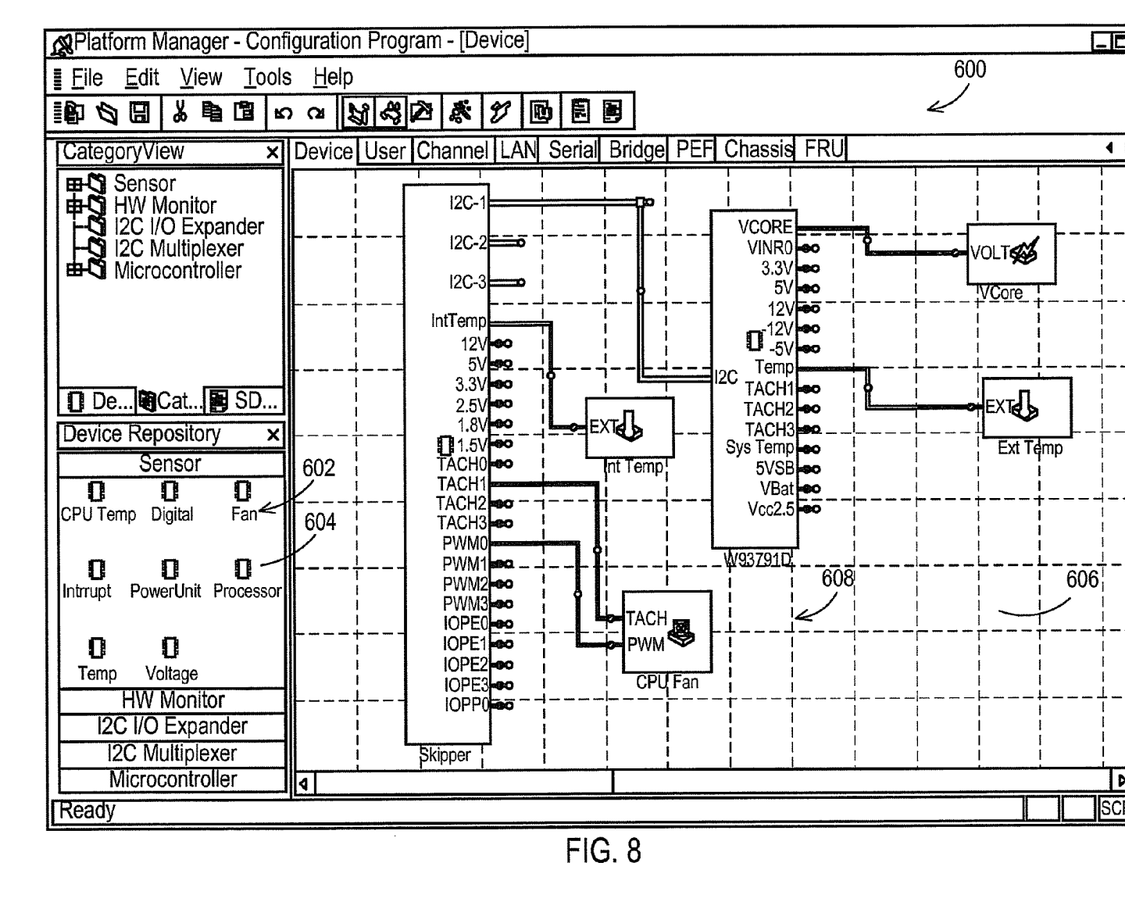
Figure 9:
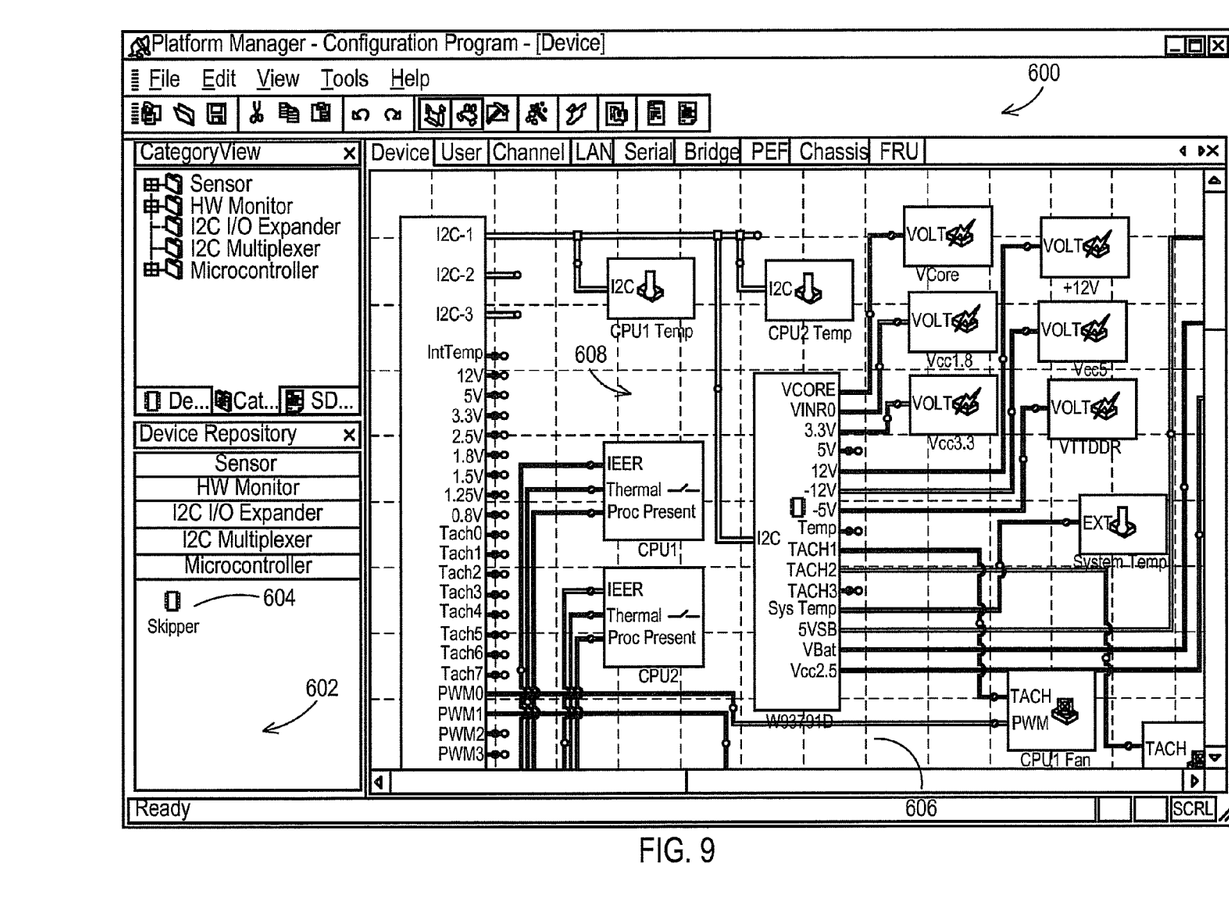

Also, the GUI 600 enables users to set up connections between two or more components. Because all components on a baseboard 102 connect to each other by contact pins, the overall layout of connections between components is referred to herein as the "pin arrangement" for the baseboard 102. For instance, FIG. 8 shows six components making up a configuration being modeled on the design page 606 as well as the connections between these six components. The model 608 provides the user with a visual representation of each component that he/she has selected based on this specific configuration specified for the baseboard 102. The source code of the configuration file 306 is also updated to reflect the connections between these selected components.

Figure 5:
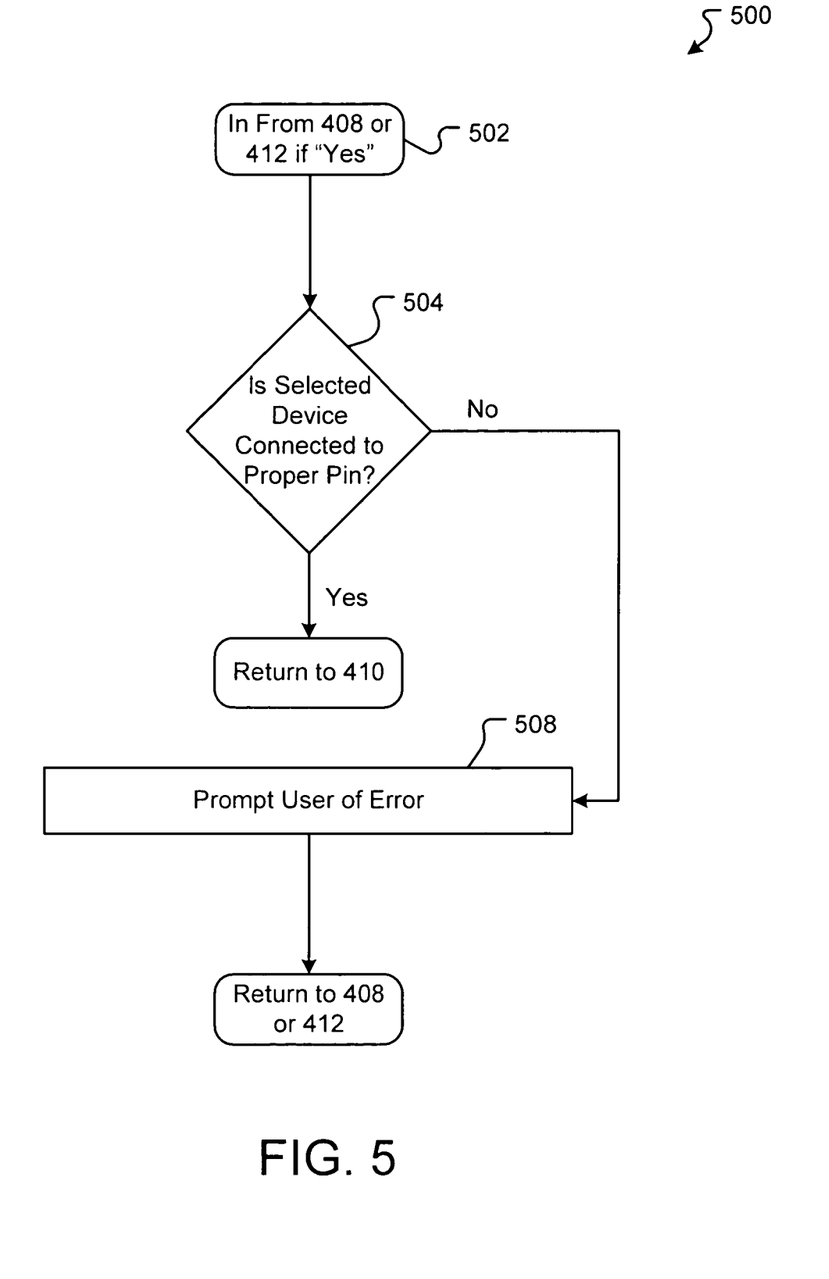
FIG. 5 is a flow diagram that illustrates operational characteristics for validating a pin arrangement for a configuration model representing a specific configuration of components specified for the computer system baseboard in accordance with an embodiment of the invention.

As described in more detail with FIG. 5, the customization program 300 may also include an error-checking program module (not shown) used to validate the pin arrangement of the model 308 on the design page 606. After the user has finished creating the model 308, he/she saves the current design, thereby saving the source code for the configuration file 306 such that the code includes a DDF 304 corresponding to each selected component. A completed configuration is shown as the completed model 308 on the GUI 600 in FIG. 9 in accordance with embodiments of the present invention. The source code of the configuration file 306 is then compiled, and the resulting binary file is incorporated into the BMC firmware 308, as shown in FIG. 3.

The above-described process illustrates the use of a customization program 300 to customize BMC firmware 308 based on a specific baseboard configuration. Operation of the customization program 300 is dependent on the timely performance of logical operations implemented on a computer system (such as 100). As such, one of skill in the art will appreciate that these logical operations may be stored on any type of computer readable medium, which may also be referred to as a "computer program product." Exemplary forms of computer readable media include computer storage media and communications media. Computer storage media includes volatile and nonvolatile, removable and non-removable media implemented in any method or technology for storage of information such as computer readable instructions, data structures, program modules or other data. As such, exemplary forms of computer storage media includes, without limitation, read only and random access memory (ROM and RAM, respectively), solid state, non-volatile memory, EEPROM, flash memory or other memory technology, magnetic tape, magnetic cassettes, magnetic disk storage, magnetic disc media or other magnetic storage devices, DVD or other optical storage, and CD-ROM. Communications media includes a modulated data signal, such as, but not limited to, a carrier wave or other transport mechanism, propagating on a carrier. A modulated data signal refers to a signal that encodes information. Exemplary forms of a carrier for communications media include, without limitation, any type of wired network and/or wireless media, such as acoustic, radio frequency, infrared and other wireless media.

It will be appreciated that the acts and symbolically represented operations include the manipulations by a CPU of electrical signals representing data bits causing a transformation or reduction of the electrical signal representation, and the maintenance of data bits at memory locations in memory, solid state, non-volatile memory, CD-ROM or any other type of storage unit (e.g., disc drive, tape drive, etc.) to thereby reconfigure or otherwise alter the operation of the computing system implementing the customization program 300, as well as other processing signals. As such, performance of these operations is referred to as being "computer executed." The memory locations where data bits are maintained are physical locations that have particular electrical, magnetic, or optical properties corresponding to the data bits.

Logical operations of embodiments of the customization program 300 are implemented (1) as a sequence of computer-implemented steps running on a computing system, and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, acts, steps or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto. In accordance with one embodiment and referring back to FIG. 1, shown therein is a general-purpose computer that implements such logical operations of this embodiment of the present invention.

Figure 4:
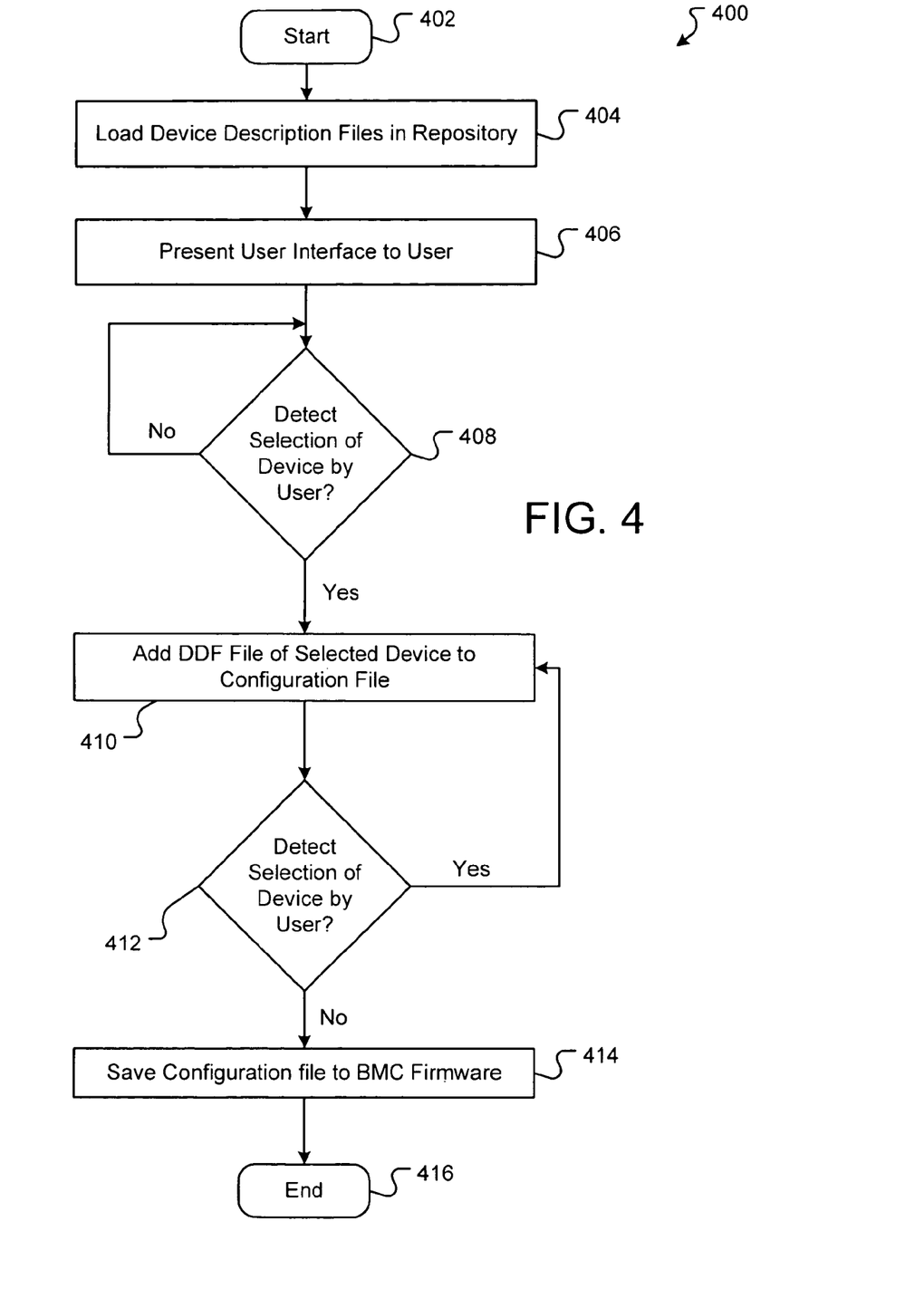
FIG. 4 is a flow diagram that illustrates operational characteristics for customizing a management module for operability with a specific configuration of components specified for a computer system baseboard in accordance with an embodiment of the present invention.

With the computing environment in mind, FIG. 4 shows a process 400 for customizing ("customization process") BMC firmware 308 for operability with a configuration specified for a baseboard 102 in accordance with an embodiment of the present invention. The customization process 400 is performed in one embodiment as a user interacts with a GUI (e.g., 600) being rendered by a specialized customization program (e.g., 300). It should be appreciated, however, that the customization process 400 may instead be performed by a software application program designed to interact with the specialized customization program 300 with minimal or no manual interaction.

As shown and described FIG. 3, customizing the BMC firmware 308 based on a specific configuration involves defining a configuration file 306 for subsequent compilation and incorporation into the BMC firmware 308. As such, the customization process 400 is illustrated in FIG. 4 as being used to initially create the source code of this configuration file 306 through a user's selection of specific DDFs 304 corresponding to components that will be communicatively connected to the BMC 104 during implementation of the configuration on the baseboard 102. However, one skilled in the art will also appreciate that one or more of the operations of the customization process 400 may also be used to update or revise previously created configuration files 306 that may or may not have already been incorporated into the BMC firmware 308.

The customization process 400 is performed, in whole or in part, by a flow of operations ("operation flow") beginning with a start operation 402 and concluding with a terminate operation 416. The start operation 402, and thus the operation flow of the customization process 400, is initiated as the GUI executable file 302 of the customization program 300 is executed by the computer system being used to customize the BMC firmware 308. From the start operation 402, the operation flow passes to a build repository operation 404.

The build repository operation 404 creates and renders on the GUI 600 a GUI component referred to herein and described above as a "repository 602," which includes an icon 604 for each component corresponding to a DDF 304 included in the DDF library 310. In an embodiment, the repository 602 is initially a GUI template void of any icons, and the build repository operation 404 fills the template with icons based on textual and appearance characteristics specified within each DDF 304 included in the DDF library 310.

After the build repository operation 404 has finished creating the repository 602, the operation flow passes to a present operation 406. The present operation 406 presents the GUI 600, including the repository 602 and the above-described design page 606, to the user through a computer display device. The GUI 600 enables users to input commands to the customization program 300, and in response to these commands, visualize a model 308 representing a graphical creation of the specific configuration file 304 for the baseboard 102. The input device that the user interacts with to enter these commands may be any type of input device (e.g., keyboard, mouse, joystick, etc.) used with conventional GUI's, as is known to those skilled in the art.

From the present operation 406, the operation flow passes to a first query operation 408. The first query operation 408 awaits a command from the user input device, and in response to receiving such a command, determines whether the user has selected a component for inclusion on the design page 606. In an embodiment, the user selects a component by "dragging" and "dropping" onto the design page 306 the icon corresponding to the component being selected. If the first query operation 408 determines that a component has been selected, the operation flow passes to an add operation 410, which is described in the following paragraph. On the other hand, if a component has not been selected, the operation flow loops back to the first query operation 408 and awaits reception of another command, at which time the first query operation 408 performs as described above.

In an embodiment, the add operation 410 performs multiple functions. First, the add operation 410 adds the DDF 304 of the selected component to the source code of the configuration file 306 being created. Second, the add operation 410 places the icon of the selected component on the design page 606, thereby providing a visual confirmation to the user that the DDF 304 has indeed been added to source code of the configuration file 306. After the add operation 410 has completed these two functions, the operation flow passes to a second query operation 412. The second query operation 412 awaits the next command input by the user, and in response to receipt of this command, determines whether the user has selected another component for inclusion on the design page 606. However, unlike the first query operation 408, the second query operation 412 references this determination against a point in time when the user requests termination of the customization program 300. That is, if the user exits the customization program 300, thereby closing the GUI 600, prior to selecting any other components from the repository 602, then the second query operation 412 branches the operation flow "no" to a save operation 414. Else, the second query operation 412 branches the operation flow "yes" back to the add operation 410, which performs the functions noted above. The operation flow then continues as previously described.

The save operation 414 saves the source code of the configuration file 308 to either permanent or temporary storage. The save operation 414 also compiles the source code of the configuration file 306 and loads the resulting binary file into an appropriate location within the BMC firmware 308, which in an embodiment, has been previously loaded onto the BMC 104. Following the save operation 414, the operation flow concludes at the terminate operation 416.

In accordance with an embodiment of the present invention, the customization program 300 enables users to not only select those components that are\will be communicatively connected to the BMC 104 based on the configuration specified for a particular baseboard 102, but to also define which components will be connected, either directly or indirectly (via, for instance, the management bus 130 and/or a sensor aggregation component 202), to which contact pins 204 of the BMC 104. In other words, the GUI 600 also provides the user with the ability to define the pin arrangement for the configuration file 306 as well as pin arrangement of the model 608.

As known to those skilled in the art, each contact pin 204 of a BMC 104 is operable to receive only certain type(s) of information, and only devices that sense, measure or transmit the information type(s) corresponding to a pin 204 may be connected either directly or indirectly to that pin 204. Referring back to the example described above, one of the pins 204 on the BMC 104 may be of the "temperature" type, and thus, only sensor devices operable to provide a temperature reading may be connected to that pin 204. To that end, the present invention also encompasses a computer-implemented method for verifying that the pin arrangement of the model 608 on the design page 606 is valid, i.e., that each pin 204 of the BMC 104 is connected to the appropriate type of component.

In accordance with an embodiment of the present invention, FIG. 5 illustrates operational characteristics associated with a process 500 for validating (hereinafter, "validation process 500") pin arrangement of the configuration file 306 being created, and thus the pin arrangement of the configuration model 608 being displayed on the design page 606 of the GUI 600. The term "validating" is used herein to mean a process by which the graphically represented connection of a component to a BMC 104 is checked to determine whether the connection is a proper connection with respect to the type associated with the input pin 204 to which the component is connected. Further, it is intended the terms "connection" and "connected" refer to the establishment of an electrical communication path between two components either directly or indirectly through one or more other components.

The validation process 500 is shown as an optional sequence of operations performed following the first query operation 408 or the second query operation 412, if either of these query operations (410 and 412) determines that a component has indeed been selected. As such, the validation process 500 validates the connection of a component to a BMC pin 204 after the user makes such a connection on the design page 606. However, it should be appreciated that the validation process 500 may instead be performed after multiple components have been connected to the BMC 104 on the design page 606. The implementation is a matter of choice, and indeed, the validation process 500 may even be performed in response only to a user's request, which, in some instances, may take place after the configuration being modeled is completed on the design page 606.

The validation process 500 is performed, in whole or in part, using an operation flow beginning with a start operation 502 and concluding with a terminate operation 512. As noted above, the validation process 500 is shown in accordance with an embodiment wherein the process 500 is performed in response to the "yes" branch of the customization process 400 being selected by either the first query operation 408 or the second query operation 412. As such, the start operation 502 is initiated upon a determination by either of these operations (408, 412) that a component was selected from the repository 602 and connected to another device in the configuration being modeled on the design page 606. From the start operation 502, the operation flow passes to a compare operation 504.

The compare operation 504 compares the selected component type to the type specified by the pin 204 to which the component is connected in order to determine whether the component is the proper type of component for connection to that pin 204. In an embodiment, the compare operation 504 makes such a determination by comparing a type tag specified within the DDF 304 corresponding to the selected component with a type tag associated with the pin 204, as specified in the DDF 304 for the BMC 104. If the type tags match, then the connection of the component to the pill 204 is proper, and the compare operation 504 passes the operation flow back to the customization process 400, where the flow resumes at the add operation 410. Otherwise, if the type tags do not match, the operation flow passes to a prompt operation 508.

The prompt operation 508 renders on the GUI 600 an error message that puts the user on notice that the proposed connection of the selected component to the pin 204 of the BMC 104 is improper. From the prompt operation 508, the operation flow is passed to the terminate operation 512 of the validation process 500, which returns the operation flow of the customization process 400 to the query operation (either 408 or 412) which initially started the validation process 500. As such, the operation flow of the customization process 400 bypasses the add operation 410 until a proper connection is selected by the user.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, the management module of the present invention is described in accordance with an embodiment as the BMC 104, which encompasses both hardware and firmware features. However, the management module may be readily replaced by any other component, either hardware or software based, or a combination of both, which is operable for monitoring and/or controlling various components of a computer system. Furthermore, components that connect to the management bus 130 may connect either by connecting directly to the baseboard 102, i.e., soldered or affixed, or by connecting indirectly to the baseboard 102, such as by way of a jumper cable to a contact pin for the management bus 130, wherein the contact pin is directly affixed to the baseboard 102. Numerous other changes and alternatives may be made which will readily suggest themselves to those skilled in the art and which are encompassed in the spirit of the invention disclosed and as defined in the appended claims.

What is claimed is:

1. A non-transitory computer-readable medium having stored thereon computer-executable instructions which, when executed by one or more processors, cause a computer to perform steps of a process for modeling a configuration of components connected directly or indirectly to a baseboard of a computer system including a Baseboard Management Controller (BMC), the process comprising the steps of:

provi­ding a graphical user interface through which a user selects one or more components included in the configuration, the one or more components including a processor of the BMC and a first device configured to be managed by the BMC;

loading a plurality of description files, each description file describing a component in a set of components which may be included in the configuration, wherein each description file specifies identification information associated with the component to which the description file is associated;

in response to a user selection of the processor and the first device on the graphical user interface, creating a configuration file by utilizing the description files associated with the processor and the first device, the description file of the first device specifying a routine executable by the BMC to receive and analyze information sensed by the first device;

in response to a user pin arrangement selection specifying a connection between a pin of the BMC and a pin of the first device on the graphical user interface, determining if the specified connection is proper;

in response to determining that the specified connection is proper, specifying the connection between the pins of the BMC and the first device in the configuration file, the BMC being responsible for monitoring operation of each of the one or more selected components when implemented on the baseboard for use within the computer system; and compiling the configuration file to a binary file to be loaded in firmware of the BMC.

2. The non-transitory computer-readable medium of claim 1, wherein the creating step comprises:
copying the description file of each of the one or more selected components to the configuration file.

3. The non-transitory computer-readable medium of claim 1, wherein the providing step comprises:
rendering on the graphical user interface a first portion comprising a plurality of graphical icons, wherein each of the plurality of graphical icons represents a component in a set of components which may be included in the configuration.

4. The non-transitory computer-readable medium of claim 3, wherein the providing step further comprises:
rendering on the graphical user interface a second portion for creating a model of the configuration of the baseboard using the plurality of graphical icons included in the first portion.

5. The non-transitory computer-readable medium of claim 4, wherein the process further comprises the step of:
receiving a command from the user through the graphical user interface selecting a first component, wherein the user enters the command by dragging a first graphical icon representing the first component from the first portion into the second portion.

6. The non-transitory computer-readable medium of claim 5, wherein the process further comprises the step of:
in response to the user dragging the first graphical icon onto the second portion, displaying on the second portion the first graphical icon.

7. The non-transitory computer-readable medium of claim 6, wherein the receiving step comprises:

receiving a command from the user through the graphical user interface requesting a connection of the first component to a particular contact pin of a second component, wherein a second graphical icon representing the second component is already displayed on the second portion.

8. The non-transitory computer-readable medium of claim 7, wherein the process further comprises the step of:
in response to the user dragging the first graphical icon onto the second portion and requesting connection of the first component to the particular contact pin of the second component, analyzing the requested connection of the first component to the particular contact pin of the second component in order to determine whether the first component is a component which may be appropriately connected to the particular contact pin; and displaying the first graphical icon as connected to the second graphical icon if the analyzing step determines that the connection of the second component to the particular contact pin is proper.

9. The non-transitory computer-readable medium of claim 8, wherein the process further comprises the step of:
presenting an error message on the graphical user interface if the analyzing step determines that the first component is not a component specified for proper connection to the particular contact pin.

10. The non-transitory computer-readable medium of claim 1, wherein the computer-readable medium is non-transitory.

11. The non-transitory computer-readable medium of claim 1, wherein the one or more components include a plurality of sensors measuring operating and performance-related parameters within the computer system, wherein at least one of the one or more components communicates with the BMC through a bus on the baseboard.

12. The non-transitory computer-readable medium of claim 11, wherein the BMC is a microcontroller integrated into the baseboard and has a plurality of contact pins through which information sensed by the plurality of sensors is received for analysis by the BMC, wherein the BMC monitors the operating and performance-related parameters and analyze the parameters to determine whether any of the parameters are outside of a predetermined operating range.

13. The non-transitory computer-readable medium of claim 12, wherein the one or more components include a CPU fan and a CPU temperature sensor;
wherein the configuration file included in the firmware includes a routine executable instructing the BMC to determine whether a temperature about a central processing unit (CPU) of the computer system sensed by the CPU temperature sensor exceeds a prescribed temperature and to control functionality of the CPU fan in response to the determination.

* * * * *